W. C. MARSH.
VALVE.
APPLICATION FILED APR. 8, 1916.
1,223,326.
Patented Apr. 17, 1917.
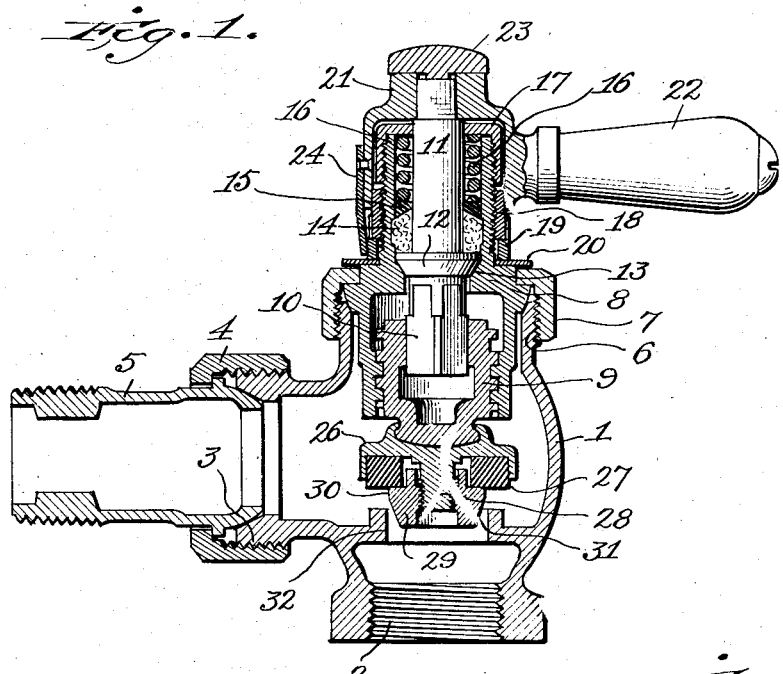
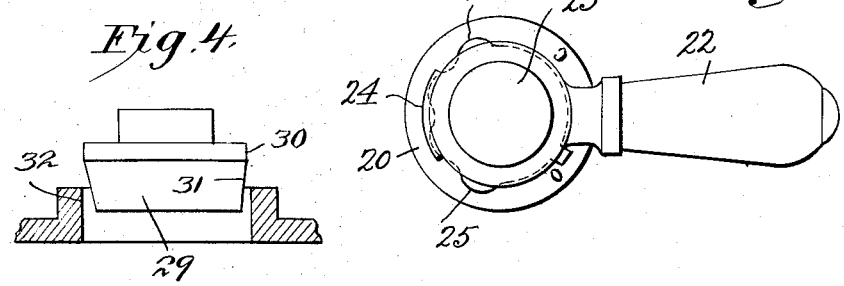
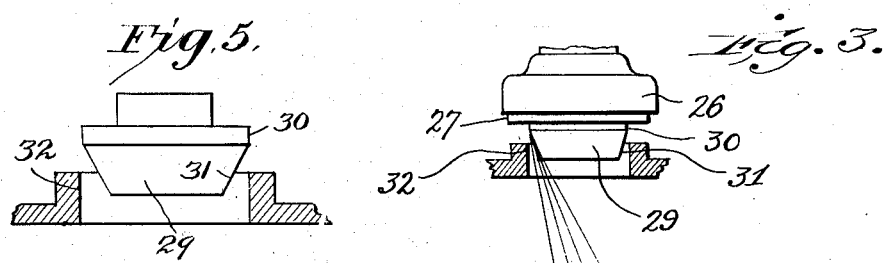
Witness
Edwin L. Yewell
Inventor
William C. Marsh
by Percy B. Hills
Attorney

UNITED STATES PATENT OFFICE.

WILLIAM C. MARSH, OF ERIE, PENNSYLVANIA, ASSIGNOR TO MARSH VALVE COMPANY, OF ERIE, PENNSYLVANIA, A CORPORATION OF NEW YORK.

VALVE.

1,223,326.  Specification of Letters Patent.  Patented Apr. 17, 1917.

Application filed April 8, 1916. Serial No. 89,775.

*To all whom it may concern:*

Be it known that I, WILLIAM C. MARSH, a citizen of the United States, residing at Erie, in the county of Erie and State of Pennsylvania, have invented certain new and useful Improvements in Valves, of which the following is a specification.

My invention relates to valves, more especially adapted for use with radiators, and with that type now known as modulated valves, and has for its objects, first, to provide a novel means for variably controlling the volume of steam to be delivered at a given opening of the valve, to suit radiators of various sizes, and, secondly, to provide an improved means for sealing the valve stem in all positions of the valve.

These objects I accomplish in the manner and by the means hereinafter described and claimed, reference being had to the accompanying drawing, in which:—

Figure 1 is a central vertical sectional view of my improved valve.

Fig. 2 is a top plan view of the handle and cap piece thereof.

Fig. 3 is a detail view of the lower end of the valve, shown in elevation, and its valve seat shown in section, the same illustrating diagrammatically valve nuts or closure members of varying pitch.

Fig. 4 is an enlarged detail sectional view of the valve seat, showing a nut or closure member therein formed on one pitch.

Fig. 5 is a view similar to Fig. 4, showing the nut or closure member formed on another pitch.

Similar numerals of reference denote corresponding parts in the several views.

In the said drawing, the reference numeral 1 denotes the body of the valve, the same having the interiorly threaded inlet aperture 2 for the reception of the supply pipe, and the exteriorly threaded discharge 3, to which may be connected, by a union nut 4, a short threaded pipe section or nipple 5, for connection with the radiator. The upper side of the body 1 is apertured and exteriorly screw threaded at 6 to receive a union nut 7, engaging with a bonnet piece 8, which projects into the interior of the body 1, as shown, said body and bonnet piece forming the valve casing. This bonnet piece 8 is interiorly screw threaded at its lower end to receive the screw threaded exterior surface of a valve carrier 9, the latter adapted to be adjusted vertically in said bonnet piece. The upper end of said valve carrier has an angular aperture adapted to receive the angular lower end 10 of a valve stem 11, whereby rotation may be imparted to said valve carrier 9, as readily will be understood.

The valve stem 11 just above the squared lower end 10 is provided with a cone 12 adapted to seat upon a similar cone surface 13 in the bonnet piece, though said cones are of slightly unequal degrees, thereby giving a pointed bearing effecting a perfect seal between the two, as readily will be understood. Resting upon the upper flat surface of the cone 12 is a packing 14 upon which in turn rests a packing ring 15 and above said packing ring is disposed a comparatively heavy coiled spring 16, all for a purpose hereinafter to be described. The exterior surface of the bonnet piece surrounding said packing and spring is screw threaded to receive at its top a cap 17, against which the upper end of the spring 16 bears, and through which the tension of said spring may be applied. Below said cap 17 there is also threaded on the exterior of the bonnet piece a lock nut 18 adapted to bear upon and retain in place a sleeve 19, which in turn bears upon and retains an indicating ring 20, the latter resting upon an exterior shoulder formed on the bonnet piece 8. Fitting over the cap 17 and upper end portion of the lock nut 18 is a cap piece 21 having attached thereto a handle 22 and being retained in place by means of a headed screw 23 engaged with the upper end of the valve stem 11. This cap piece 21 has riveted or otherwise attached thereto at one side a spring pointer 24 which is adapted to engage at its lower free end with a notched portion 25 on the outer face of the sleeve 19, as best seen in Fig. 2, whereby the cap piece 21, handle 22 and valve stem 11 will be retained in any adjusted position against any but a positive movement.

The valve carrier 9 at its lower end has swiveled thereon a valve piece 26, which is provided on its under-surface with an annular packing ring 27 and is formed with a central downward screw-threaded projection 28, adapted removably to receive a nut 29 provided with an upper straight circular throat 30 and a lower coned surface 31, the same forming a closure member, the throat 30 being adapted to fit snugly into the valve seat 32 when the valve is closed. In Fig. 1 the valve is shown in semi-open position, but when closed it is intended that the packing 27 shall rest and press upon the upper face of the valve seat 32, the throat 30 of the nut 29 fitting within said valve seat, it being understood that the nut 29 when screwed to position upon the projection 28 operates to retain the annular packing 27 in position.

I have shown in Fig. 3 diagrammatically different pitches for the cone surface 31 of the nut 29, it being understood that as said nut is removable, it is intended that nuts having cones of different pitch may be employed in the same valve to suit varying conditions of the radiator in which it is used. Thus, by increasing the pitch of the cone used, the capacity of the valve to admit steam, when the lower edge of the throat 30 of the cone leaves the valve seat, will be increased proportionately. The different markings indicated on Fig. 3 are intended to illustrate different cones having varying pitches. Thus, the indication "0 to 20 feet" denotes a slight pitch for a radiator capable of receiving not over twenty feet of steam, while the next designation "20 to 40 feet" is intended to illustrate a pitch of the cone for a radiator adapted to receive between twenty and forty feet of steam. In other words, by using these nuts with cones of different pitches, the same valve will serve for any sized radiator, being adapted to deliver a volume of steam, under a given lift, to correspond to the number of feet of heating surface in the radiator. By providing the nut 29 with the throat 30, I provide for an appreciable lift of the valve before the passage of steam is permitted through a further lift of the coned surface 31, thus providing against any burning of the packing ring 27, due to a slight opening of the valve.

By employing the cone 12 on the valve stem 11, coöperating with the coned surface 13 in the bonnet piece 8, and by varying the relative pitch of said cone and cone seat slightly, as for instance about one fourth of a degree, I provide an annular bearing point which effects a perfect seal, this bearing being maintained by the pressure of the spring 16. But in the event of injury or wear to this seal, I provide the packing 14 on top thereof, which is also maintained in place by the spring 16, and acts automatically to reinforce the packless seal, which construction may properly be termed a reinforced packless seal.

The valve handle 22 may be disposed in any desired position by closing the valve, then loosening the union nut 7, and turning the bonnet piece 8 and the parts carried thereby until the handle is in the desired position. The bonnet piece may then be locked in this position by screwing down the union nut 7, and the indicating ring 20 should be turned so that the closed position indicated thereon will register with the pointer 24, the same being locked in position through the lock nut 18.

Having thus described my invention, what I claim as new and desire to secure by Letters Patent, is:—

1. A valve, comprising a casing, a fixed valve seat therein, a valve for said seat embodying interchangeable closure members formed with cone surfaces of different pitch adapted to vary the extent of opening of said valve under a given movement of the latter, and means for operating said valve.

2. A valve, comprising a casing, a fixed valve seat therein, a valve for said seat embodying a valve piece, an annular packing ring therein adapted to contact with the valve seat, interchangeable closure members adapted to said valve piece having cone surfaces of different pitch and adapted, when screwed to position, to engage and retain said packing ring in position, and means for operating said valve.

3. A valve, comprising a casing, a fixed valve seat therein, a valve for said seat embodying interchangeable closure members each formed with a straight throat adapted, when said valve is closed, to project within the valve seat, and with cone surfaces of different pitch below said seat, and means for operating said valve.

4. A valve, comprising a casing, a valve seat therein, a valve for said seat, a rotary valve stem, a cap piece engaging said stem to rotate the same, a handle for said cap piece, a spring pointer on said cap piece, a sleeve on the valve casing having a notched portion adapted to be engaged by said pointer, and an indicating ring below said sleeve and retained in place thereby.

In testimony whereof I hereunto set my hand this 7th day of April, 1916.

WM. C. MARSH.